US012275077B2

(12) United States Patent
Chepets

(10) Patent No.: US 12,275,077 B2
(45) Date of Patent: Apr. 15, 2025

(54) EXTENDIBLE OUTFEED ACCESSORY FOR A TABLE SAW

(71) Applicant: Igor Chepets, Brooklyn, NY (US)

(72) Inventor: Igor Chepets, Brooklyn, NY (US)

( * ) Notice: Subject to any disclaimer, the term of this patent is extended or adjusted under 35 U.S.C. 154(b) by 358 days.

(21) Appl. No.: 17/530,222

(22) Filed: Nov. 18, 2021

(65) Prior Publication Data

US 2023/0150045 A1    May 18, 2023

(51) Int. Cl.
*B23D 59/00* (2006.01)
*B23Q 1/44* (2006.01)

(52) U.S. Cl.
CPC .............. *B23D 59/00* (2013.01); *B23Q 1/44* (2013.01)

(58) Field of Classification Search
CPC ........ B25H 1/0035; B25H 1/02; B23D 59/00; B23D 47/025; B23D 47/045; B23D 47/06; B23D 51/04; B23D 57/0092; B23Q 1/44; B23Q 1/74; B23Q 1/766; B23Q 3/105; B27B 5/222; B27B 31/08; A47B 13/04; B65G 13/12; B65G 15/26; B65G 47/42
USPC .............. 83/163, 443; 144/253.5, 253.8, 287
See application file for complete search history.

(56) References Cited

U.S. PATENT DOCUMENTS

| | | | | | |
|---|---|---|---|---|---|
| 1,326,809 A | * | 12/1919 | Twiss | ....................... | A47B 3/10 144/285 |
| 1,418,024 A | * | 5/1922 | Rider | ..................... | B65G 13/00 193/18 |
| 1,935,734 A | * | 11/1933 | Twomley | ................ | B65G 13/12 472/91 |
| 2,555,217 A | * | 5/1951 | Young | ..................... | B27B 25/02 83/436.1 |
| 2,576,217 A | * | 11/1951 | Ira | .......................... | B65G 21/14 198/313 |
| 2,590,359 A | * | 3/1952 | Oscar | ..................... | B65G 13/12 193/35 TE |
| 3,276,558 A | * | 10/1966 | Guske | .................... | B65G 13/12 193/35 TE |
| 3,615,087 A | * | 10/1971 | Hickman | .................. | B25B 1/10 144/287 |
| 3,633,449 A | * | 1/1972 | Knudsen | ................ | B26D 1/245 83/176 |
| 4,068,551 A | * | 1/1978 | Kreitz | .................. | B23D 47/025 108/77 |
| 4,106,381 A | * | 8/1978 | Kreitz | ...................... | B23Q 1/74 83/648 |
| 4,248,115 A | * | 2/1981 | Brodbeck | ................ | B23Q 1/72 144/287 |

(Continued)

FOREIGN PATENT DOCUMENTS

| | | | | | |
|---|---|---|---|---|---|
| CN | 106144424 A | * | 11/2016 | ............. | B65G 21/14 |
| JP | 61064609 | * | 9/1984 | ............. | B65G 13/12 |

*Primary Examiner* — Ghassem Alie
*Assistant Examiner* — Samuel A Davies
(74) *Attorney, Agent, or Firm* — Mestechkin Law Group P.C.

(57) ABSTRACT

A table saw accessory is provided that generally includes: an outfeed support having at least one surface for supporting material fed through the table saw beyond an end thereof; a telescopic section having a proximal end and a distal end, and configured to extend outward from the end of the table saw, where the outfeed support is coupled to the telescopic section at the end thereof; and a connection system for attaching the accessory to the table saw, where the connection system is coupled to the telescopic section at the proximal end thereof.

12 Claims, 5 Drawing Sheets

(56) References Cited

U.S. PATENT DOCUMENTS

| | | | | | |
|---|---|---|---|---|---|
| 4,266,650 | A * | 5/1981 | Patel | ................ | B65G 13/12 |
| | | | | | 193/35 TE |
| 4,393,969 | A * | 7/1983 | Woell | .................... | B65G 13/11 |
| | | | | | 193/35 TE |
| 4,640,326 | A * | 2/1987 | Hewitt | ................ | B23D 47/025 |
| | | | | | 248/240.4 |
| 5,004,029 | A * | 4/1991 | Garner | .................... | B25H 1/04 |
| | | | | | 144/287 |
| 5,255,724 | A * | 10/1993 | Butke | .................... | B23Q 1/74 |
| | | | | | 144/286.5 |
| 5,497,816 | A * | 3/1996 | Darland | ............... | B23D 47/025 |
| | | | | | 248/676 |
| 6,347,773 | B1 * | 2/2002 | Gross | .................... | B27B 21/00 |
| | | | | | 248/176.1 |
| 6,484,869 | B1 * | 11/2002 | Brouwer | ................ | B66B 29/08 |
| | | | | | 198/950 |
| 7,647,872 | B2 * | 1/2010 | Pitchford | ................ | B23Q 1/74 |
| | | | | | 108/9 |
| 8,418,591 | B2 * | 4/2013 | Frolov | ................ | B23D 47/025 |
| | | | | | 144/287 |
| 8,678,527 | B2 * | 3/2014 | Healy | ..................... | B25H 1/04 |
| | | | | | 312/327 |
| 9,376,130 | B1 * | 6/2016 | Wise | ....................... | B25H 1/04 |
| 9,527,144 | B2 * | 12/2016 | Frolov | ................ | B23D 47/025 |
| 10,518,433 | B2 * | 12/2019 | Torres | ..................... | B27B 5/29 |
| 2003/0075033 | A1 * | 4/2003 | Speakman | ........... | B23D 47/025 |
| | | | | | 83/471 |
| 2004/0004416 | A1 * | 1/2004 | Price | ..................... | A47B 77/02 |
| | | | | | 312/236 |
| 2005/0056132 | A1 * | 3/2005 | Smith | .................... | B27G 5/023 |
| | | | | | 83/438 |
| 2005/0077141 | A1 * | 4/2005 | Lee | ........................ | B23Q 3/105 |
| | | | | | 193/35 SS |
| 2005/0098232 | A1 * | 5/2005 | Logan | ..................... | B25H 1/04 |
| | | | | | 144/286.5 |
| 2006/0157100 | A1 * | 7/2006 | Zeigler | ................. | B65G 13/12 |
| | | | | | 52/646 |
| 2007/0107806 | A1 * | 5/2007 | Jesberger | ............ | B23D 47/025 |
| | | | | | 144/286.5 |
| 2007/0113928 | A1 * | 5/2007 | Liu | ......................... | B25H 1/10 |
| | | | | | 144/287 |
| 2009/0007743 | A1 * | 1/2009 | Yu | .......................... | B27B 5/222 |
| | | | | | 83/477 |

\* cited by examiner

EXTENDIBLE OUTFEED ACCESSORY FOR A TABLE SAW

BACKGROUND

This patent application relates to table saw accessories and more particularly table saw outfeed tables.

Table saws are indispensable tools for woodworkers and come in a variety of sizes and configurations. For example, table saws come in compact sizes for field use by contractors, for example, and in larger, non-portable cabinet type units for production shops. Regardless of size of the table saw, the sheet stock that is being cut is often much larger than the tabletop thereof, often requiring an outfeed table to manage unwieldy stock. Outfeed tables, however, have limited use and may not be an acceptable solution for a small shop. Folding outfeed tables exist, but those too have limitations, including flimsy construction and/or difficulty in assembly when necessary to handle large sheet stock. Accordingly, there is a need for a table saw accessory for supporting outfeed that is not so limited.

SUMMARY

In one aspect, a table saw accessory is provided that includes: an outfeed support having at least one surface for supporting material fed through the table saw beyond an end thereof; a telescopic section having a proximal end and a distal end, and configured to extend outward from the end of the table saw, wherein the outfeed support is coupled to the telescopic section at the end thereof; and a connection system for attaching the accessory to the table saw, wherein the connection system is coupled to the telescopic section at the proximal end thereof.

In one embodiment, the telescopic section is configured to extend outward as the material extends beyond the end of the table saw.

In one embodiment, the outfeed support is configured to rotate about an axis parallel to a tabletop of the table saw as the telescopic section extends outward.

In one embodiment, the telescopic section comprises at least one spatial scissor mechanism.

In one embodiment, the at least one spatial scissor mechanism comprises a plurality of hinged links pivotally coupled to each other.

In one embodiment, the at least one spatial scissor mechanism comprises a plurality of pairs of hinged links pivotally coupled to each other, the plurality of pairs of hinged links connected to each other in series such that extension of one of the pair of hinged links translates to an outward movement in another of the pair of hinged links.

In one embodiment, the plurality of pairs of hinged links are dimensioned between joints thereof so that outward expansion in each of the plurality of the pair of hinged links is equal.

In one embodiment, the at least one spatial scissor mechanism comprises a first and a second spatial scissor mechanism, each comprising a plurality of hinged links pivotally coupled to each other, and at least one lateral strut interconnecting a joint associated with the plurality of hinged links of the first spatial scissor mechanism with a joint associated with the plurality of hinged links of the second spatial scissor mechanism.

In one embodiment, the at least one spatial scissor mechanism comprises a plurality of hinged links pivotally coupled to each other, the connection system comprising a top and a bottom connector interface element, each pivotally attached to one of the plurality of hinged links.

In one embodiment, the top the interface element comprises a cylindrical structure and wherein the connection system further comprises a pin that passes through the cylindrical structure of the top interface and that fixedly attaches the top interface element with respect to vertical movement to the table saw.

In one embodiment, the connection system is configured for the bottom interface element to move vertically relative to the table saw.

In one embodiment, the bottom interface element is fixed with regard to horizontal movement.

In one embodiment, the bottom interface element comprises a cylindrical structure and wherein the pin passes through the cylindrical structure of the bottom interface.

In one embodiment, the outfeed support comprises at least one curved section, which, when the accessory is in a retracted position, the at least one curved section extends vertically upward to cross a plane of a tabletop of the table saw.

In one embodiment, the outfeed support comprises a first planer section adjacent to the curved section, and wherein the outfeed support is configured to rotate about an axis parallel to the tabletop of the table saw and for the first planer section to flatten as the telescopic section extends outward.

In one embodiment, the outfeed support comprises a second planer section adjacent to the first planer section and at an angle relative thereto to act as a stop for the material.

In another aspect, a table saw accessory is provided that includes: an outfeed support having at least one surface for supporting material fed through the table saw beyond an end thereof, the outfeed support comprising at least one curved section, which, when the accessory is in a retracted position, the at least one curved section extends vertically upward to cross a plane of a tabletop of the table saw; a telescopic section having a proximal end and a distal end, and configured to extend outward from the end of the table saw as the material extends beyond the end of the table saw, the outfeed support coupled to the telescopic section at the end thereof, wherein the telescopic section comprises a plurality of pairs of hinged links pivotally coupled to each other and wherein the plurality of pairs of hinged links are connected to each other in series such that extension of one of the pair of hinged links translates to an outward movement in another of the pair of hinged links; and a connection system for attaching the accessory to the table saw, wherein the connection system is coupled to the telescopic section at the proximal end thereof.

In one embodiment, the outfeed support is configured to rotate about an axis parallel to the tabletop of the table saw as the telescopic section extends outward.

In one embodiment, the outfeed support comprises a first planer section adjacent to the curved section, and wherein the outfeed support is configured for the first planer section to flatten as the telescopic section extends outward.

In one embodiment, the outfeed support comprises a second planer section adjacent to the first planer section and at an angle relative thereto to act as a stop for the material.

DETAILED DESCRIPTION

The present application provides a table saw outfeed extension accessory which overcomes some or all the drawbacks associated with prior attempted solutions in the art. Although the accessory may be discussed herein in relation to a certain type of table saws, it is understood that the accessory may be applied to various types of circular table saws, such as a cabinet, contractor types, etc., as well as non-circular saw type tools, such as band saws, scroll saws, router tables, workbenches, assembly tables, etc. Accordingly, the system is not limited for use on any one type of tool that includes a table or tabletop.

Figure 1:
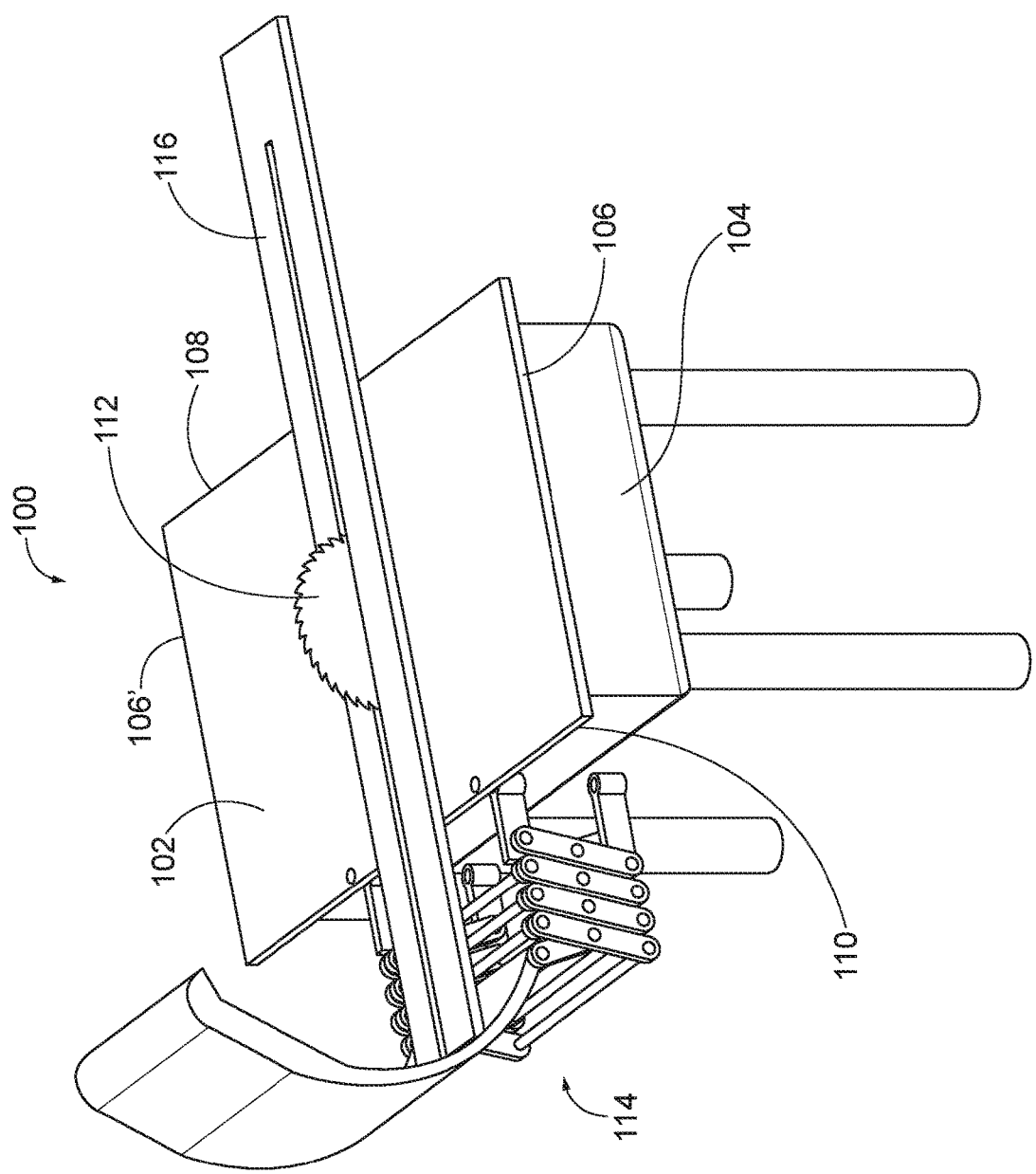
FIG. 1 is a perspective view showing a table saw with an extendible outfeed accessory according to at least one of the embodiments of the accessories disclosed herein attached thereto and disposed in a retracted position.

Referring to FIG. 1, a table saw 100 generally includes a tabletop 102 and a base 104 to which the tabletop 102 is affixed and supported thereby. The tabletop 102 has a left side 106 and a ride side 106' (opposite the left side 106). The left and right sides 106, 106' may be parallel to each other. The tabletop 102 further includes a front or proximal end 108 and back or distal end 110 (opposite the front 108). The front and back 108, 110 may be parallel to each other and may be generally perpendicular to the sides 106, 106'. The tabletop 102 preferably includes therein a slot through which the saw blade 112 protrudes, such as the circular saw blade shown. The saw blade 112 is preferably retractable relative to the top 102. Material or stock 116 that is being cut is placed on the top 102 and while the saw blade 112 is rotating, the user pushes the material 116 through the blade 112, as shown. The table saw 100 may include an extendible outfeed accessory 114 for supporting the outfeed as the material 116 extends beyond the back 110 of the tabletop 102. The outfeed accessory 114 may be attached to either side 106, 106', and/or the front and back ends 108, 110.

Figure 2:
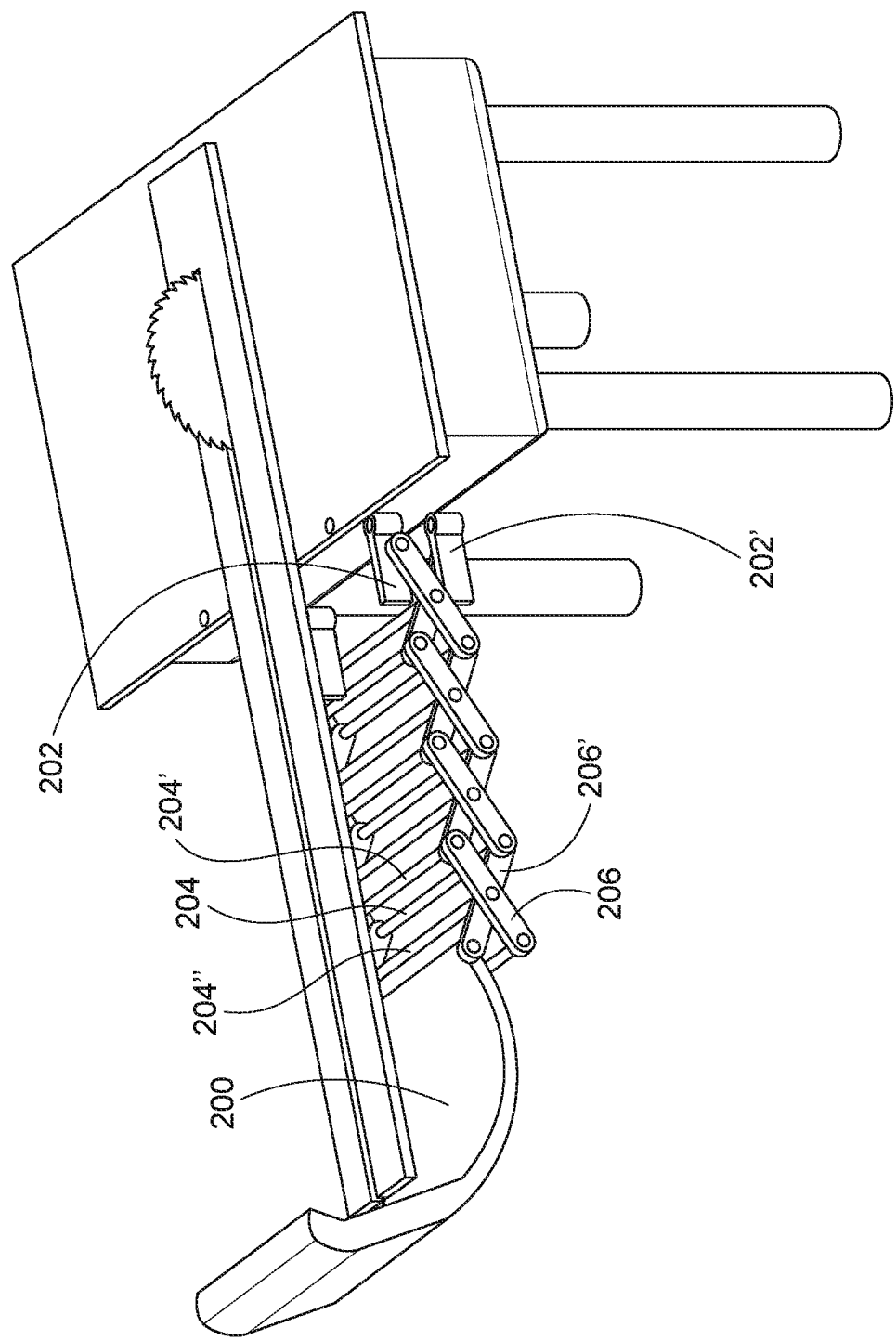
FIG. 2 is a perspective view showing a table saw with an extendible outfeed accessory according to at least one of the embodiments of the accessories disclosed herein attached thereto and disposed in an extended position.

Referring to FIG. 2, in one embodiment, the accessory 114 includes an outfeed support, a telescopic section attached at one end to the outfeed support, and a connection system attached to the other/opposite end of the telescopic section for attaching the accessory to the base 104 of the table saw 100. The outfeed support 200 generally provides one or more surfaces that supports the material 116 as the material 116 is pushed beyond the back end 110 of the table saw 100. The telescopic section generally extends the outfeed support distally as the material 116 is pushed beyond the back end 110 of the table saw 100. Preferably, the support 200 is coupled to the telescopic section at the distal end thereof and is configured to rotate about an axis parallel to the tabletop 102 as material 116 is pushed beyond the back end 110 of the table saw 100 and as the telescopic section extends distally. The connection system connects the telescopic section to the base 104 and/or the tabletop 102 of the table saw 100.

The telescopic section may provide the desired functionality, i.e., extensibility, in a variety of ways. In a preferred embodiment, the telescopic section includes at least one or preferably at least two spatial scissor mechanisms (a left scissor mechanism and a right scissor mechanism, as shown), which each includes a pair of hinged links 206, 206' pivotally coupled to each other. The hinged links 206, 206' are preferably connected in series at the ends thereof to at least one or a plurality of other pairs of hinged links, interconnected such that extension of one of the pair of hinged links 206, 206' translates to a distal movement in each of the other pair of hinged links. The plurality of hinged links may be dimensioned between joints equally so that translation or distal expansion is equal in each of the pair of hinged links 206, 206'.

The left and right scissor mechanisms are preferably coupled to each other with one or more lateral struts 204, 204', 204" that maintain the distance between equivalent pairs of hinged links on the opposite scissor mechanism. In one embodiment, the telescopic section includes one or more of a bottom strut 204, a top strut 204', and/or middle strut 204". The bottom struct interconnects the hinged links at the bottom joint, the middle strut 204" interconnects the hinged links at the intersection thereof, and the top struct 204' interconnects the hinged links at the top joint and the top strut may further be disposed at an elevation sufficient to support the material 116 as it is fed past the back end 110 of the tabletop 102, as shown. In either event, the telescopic section terminates proximally with a connection system interface, which preferably includes a top and bottom connector interface elements 202, 202', which allow the top and bottom links of the hinged links to move vertically relative to each other as the telescopic section extends outward from the tabletop 102, as shown between FIG. 1 and FIG. 2.

Figure 3:
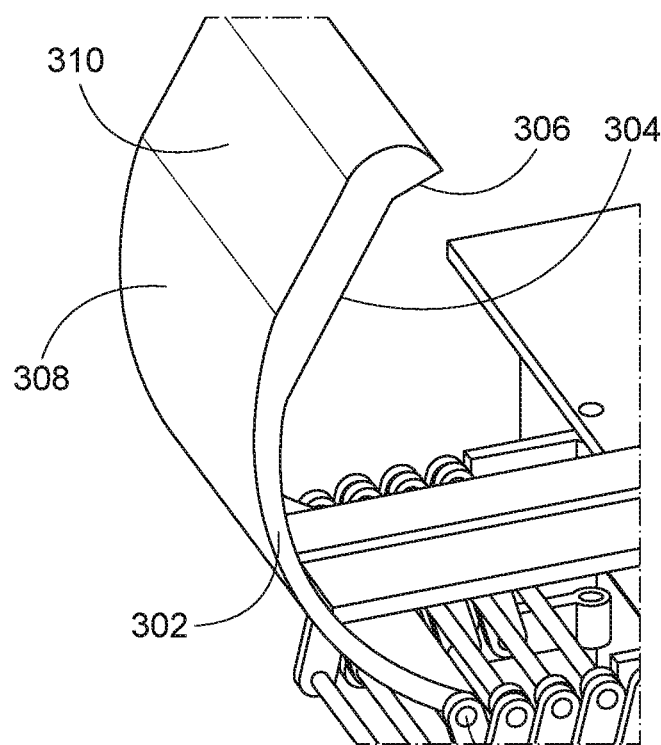
FIGS. 3-4 are perspective views showing an outfeed support portion of the extendible outfeed accessory according to at least one of the embodiments of the accessories disclosed herein.
Figure 4:
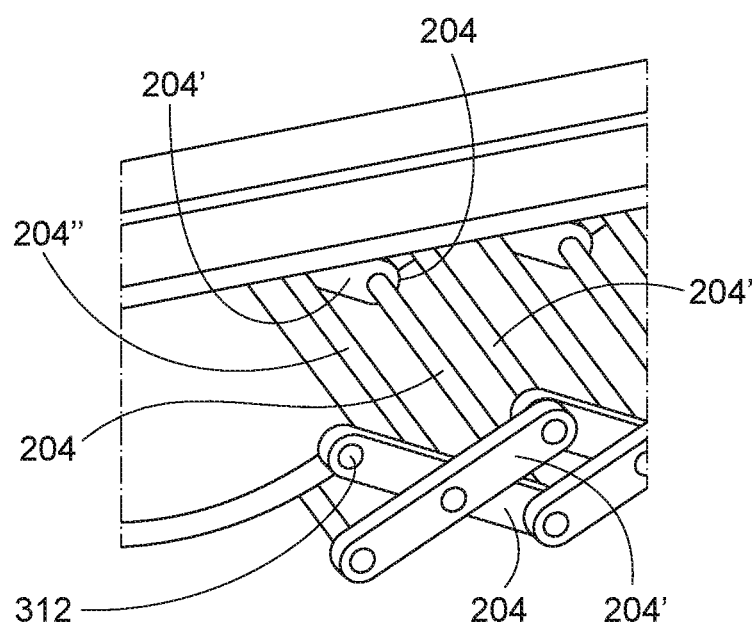

Referring to FIGS. 3-4, the outfeed support 200 may take a variety of shapes. For example, the outfeed support 200 may simply be a cylindrical, oval, rectangular, and/or a square bar or similar shape with a surface located at an elevation approximately as that of the tabletop 102 to support the material 116. Similarly, the outfeed support 200 may be a flat panel that is installed to be essentially parallel and/or in the same plane as that of the tabletop 102. If attached directly to the top joint, the outfeed support 200 may, depending on the means for attaching the accessory 114 to the table saw 100, lower as the scissor mechanism extends outward. In this regard, the support 200 may be a cam (i.e., have a ramped and/or curved support surface, as shown) or operate on a cam mechanism that rotates and that maintains the support surface essentially in the same plane as the tabletop 102, for example, accounting for manufacturing tolerances, as the material 116 is fed through the saw 112 and as the accessory extends outward.

Alternatively or additionally, the outfeed support 200 may include at least one upwardly curved section 302, which in the retracted position extends vertically upward to cross the plane of the tabletop 102 and/or the material 116, as shown. The curved section 302 may be followed distally with a first planer section 304 and then a second planer section 306. Preferably, the outfeed support 200 is coupled to the distal end of the telescopic section such that the outfeed support 200 rotates about an axis 312 parallel to the tabletop 102 and/or perpendicular to the saw blade 112 as the outfeed support 200 extends distally. For example, the outfeed support 200 may be fixedly attached to the top joint of the hinged links 206, 206' so that as the vertical orientation of the hinged links 206, 206' flattens, so does the outfeed support 200 which as a result effectively pivots about the axis between the middle joints of the effective hinged links 206, 206' to which the outfeed support 200 is attached. In this regard, the accessory 114 may be configured so that the curved section 302 pivots as the accessory 114 extends so that the curved section 302 does not interfere with the material 116 as the material 116 is fed past the back end 110 of the tabletop 102, as shown in FIG. 2. Alternatively, the accessory 114 may be configured to extend distally when the material 116 touches the curved section 302 and flattens as the accessory 114 extends outward. Moreover, the accessory 114 may be configured such that the first planer section 304 flattens to the point that it becomes essentially level (e.g., +/−5 degrees) at full extension, preferably at the same level as the tabletop 102. The second planer section 306 preferably acts as a stop to prevent the material 116 from being fed beyond the distal end of the outfeed support 200 when fully extended. The accessory may include a counterweight or a post below the accessory and that moves outwardly from the table saw 100 along with the outfeed support 200 to prevent the table saw 100 from tipping as the material is fed through the saw 112.

The telescopic extension may be operated manually and/or may be automated so that the outfeed support will extend distally to provide support for the material 116 as it passes beyond the back end 110 of the tabletop 102. The latter may be accomplished with one or more sensor that determines the extent that the material 116 has moved beyond the back end 110 and/or the proximal end of the outfeed support 200, and sends a signal to a controller/motor that causes the outfeed accessory/telescopic section to extend accordingly. The sensor may be light a sensor that is located on the accessory and/or the outfeed support, in-line with the saw blade 112, so that when the material 116 covers the light sensor, the controller/motor causes the outfeed accessory/telescopic section to extend until the light sensor is once again uncovered. Several light sensors, for example, along the proximal edge of the outfeed support 200, may be used for the controller/motor to determine based thereon that the material has been removed completely from the outfeed support 200 and thus cause retraction of the outfeed accessory/telescopic section in response thereto. This functionality may also be achieved with one or more pressure sensors, for example, that sense pressure or weight on the outfeed support 200 as the material 116 is fed through the saw blade 112 and that signals the controller to extend proportionally as the pressure/weight of the material 116 on the sensor increases as the material 116 is fed through the saw blade 112. When pressure/weight is removed, the outfeed support 200 may return to the retracted position automatically.

Figure 5:
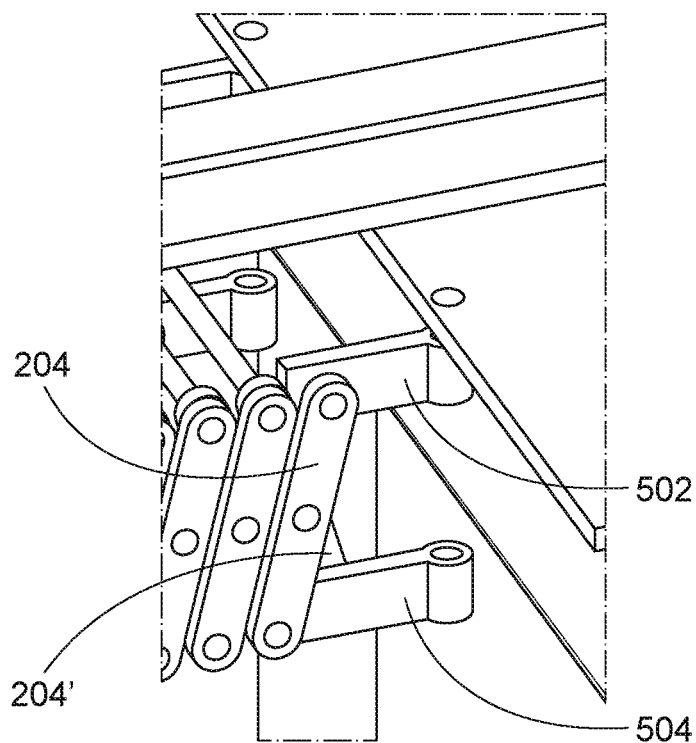
FIGS. 5-6 are perspective views showing the connector interface elements portion for the extendible outfeed accessory according to at least one of the embodiments of the accessories disclosed herein in retracted and extended positions, respectively.
Figure 6:
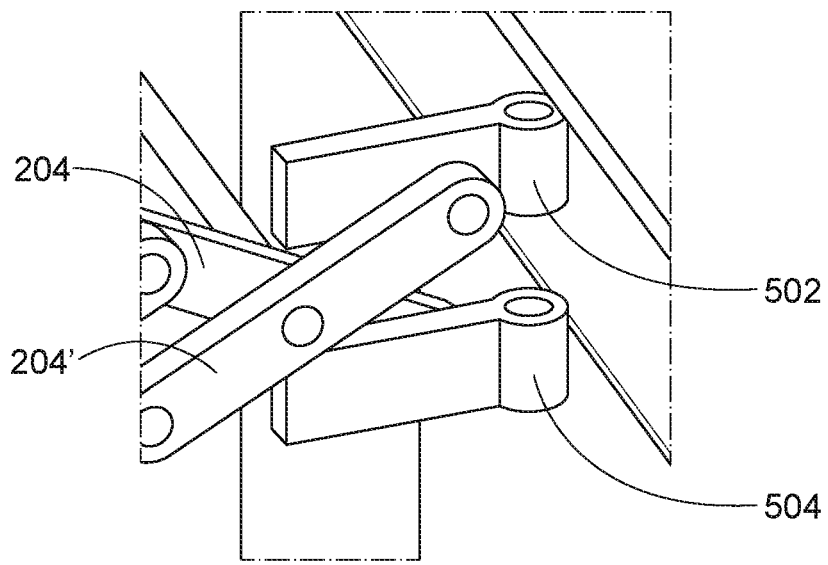

Referring to FIGS. 5-6, in one embodiment, the connector interface elements for the extendible outfeed accessory 114 includes a top interface element 502 and a bottom interface element 504, each attached to one of a top joint and a bottom joint of the hinged links 206, 206', as shown. As shown between FIGS. 5 and 6, as the accessory 114 extends distally, the top and bottom joints of the scissor mechanism move vertically closer together and the top and bottom interface elements 502, 504 therefore also move vertically relative to each other. In a preferred embodiment, the top interface element 502 is fixed both against vertical and horizontal movement relative to the table saw 100 whereas the bottom interface 504 element is free to move vertically, as shown, but preferably otherwise fixed. The interface elements 502, 504 are generally pivotally connected to the ends of the hinged links 206, 206', as shown. At the opposite end of thereof, the interface elements 502, 504 may include cylindrical structure that mates with or receives corresponding structure attached to the table saw 100 (collectively, the connection system).

Figure 7:
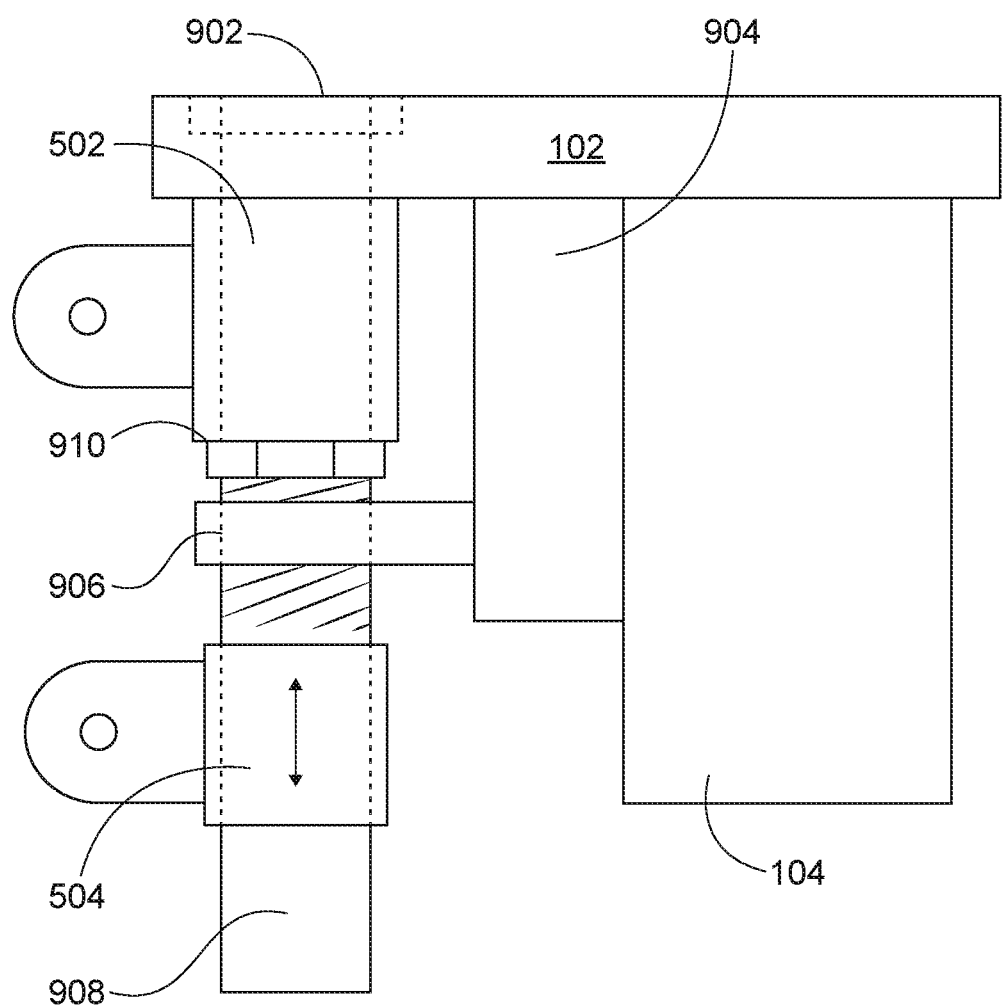
FIG. 7 is a side view showing an exemplary connection system for attaching the extendible outfeed accessory to a table saw.

Referring to FIG. 7, an exemplary embodiment of the connection system is shown. The connection system includes top and bottom interface elements 502, 504, which have collinear cylindrical structures that mate with a pin 908. The pin 908 may be fixedly attached to the table saw 100 and more specifically the tabletop 102. In a preferred embodiment, the tabletop 102 includes therein a recessed hole to accept the head 902 of the pin 908 so that the top of the pin 908 is flush with the tabletop 102, as shown. The pin 908 may include a threaded section for fixing the top interface element 502 to the table saw 100 and/or tabletop 102. The head 902 may include a slot therein to accommodate a screwdriver. The top interface element 502 may include corresponding threads or a threaded nut 910 may be provided to fix the top interface element 502 relative to the top 102 for use. The pin 908 preferably has sufficient length for the bottom interface element 504 to move vertically in a collinear path provided by the pin 908 while preventing horizontal movement along the range of vertical movement of the bottom interface element 504. The system may also include a support 904 that attaches to the table saw base 104 and that has a flange 906 extending therefrom with a hole therein to accommodate and provide support for the pin 908 against horizontal movement. The flange 904 may be installed between the top and bottom interface elements 502, 504, as shown, or below both elements 502, 504.

While the foregoing has been described in some detail for purposes of clarity and understanding, it will be appreciated by one skilled in the art, from a reading of the disclosure, that various changes in form and detail can be made without departing from the true scope of the invention.

The invention claimed is:

1. A table saw accessory configured to attach to a table saw having a tabletop and a distal end, the table saw accessory comprising:
   an outfeed support having at least one surface for supporting material fed through the table saw beyond the distal end of the table saw;
   a telescopic section having a proximal end and a distal end, and configured, when the table saw accessory is attached to the table saw, to extend outward from the distal end of the table saw between a retracted position and an extended position, wherein the outfeed support is coupled to the telescopic section at the distal end of the telescopic section and configured to automatically rotate about an axis parallel to the tabletop of the table saw as the telescopic section extends outward between the retracted position and the extended position, and wherein the telescopic section comprises at least one spatial scissor mechanism; and
   a connection system for attaching the table saw accessory to the table saw, wherein the connection system is coupled to the proximal end of the telescopic section, and wherein the at least one surface for supporting material fed through the table saw of the outfeed support comprises at least one upwardly curved section, the table saw accessory configured so that, when the table saw accessory is attached to the distal end of the table saw and when the telescopic section is in the retracted position, the at least one curved section extends vertically upward and crosses a plane of the tabletop of the table saw.

2. The table saw accessory of claim 1, wherein the at least one spatial scissor mechanism comprises a plurality of hinged links pivotally coupled to each other.

3. The table saw accessory of claim 1, wherein the at least one spatial scissor mechanism comprises a plurality of pairs of hinged links pivotally coupled to each other, the plurality of pairs of hinged links connected to each other in series such that extension of one of the pair of hinged links translates to an outward movement in another of the pair of hinged links.

4. The table saw accessory of claim 3, wherein the plurality of pairs of hinged links are dimensioned between joints thereof so that outward expansion in each of the plurality of the pair of hinged links is equal.

5. The table saw accessory of claim 1, wherein the at least one spatial scissor mechanism comprises a first and a second spatial scissor mechanism, each comprising a plurality of hinged links pivotally coupled to each other, and at least one lateral strut interconnecting a joint associated with the plurality of hinged links of the first spatial scissor mechanism with a joint associated with the plurality of hinged links of the second spatial scissor mechanism.

6. The table saw accessory of claim 1, wherein the at least one spatial scissor mechanism comprises a plurality of hinged links pivotally coupled to each other, the connection system comprising a top interface element and a bottom interface element, each pivotally attached to one of the plurality of hinged links.

7. The table saw accessory of claim 6, wherein the top interface element comprises a cylindrical structure and wherein the connection system further comprises a pin that passes through the cylindrical structure of the top interface element and that fixedly attaches the top interface element with respect to vertical movement to the table saw.

8. The table saw accessory of claim 7, wherein the connection system is configured for the bottom interface element to move vertically relative to the table saw.

9. The table saw accessory of claim 8, wherein the bottom interface element is fixed with regard to horizontal movement.

10. The table saw accessory of claim 9, wherein the bottom interface element comprises a cylindrical structure and wherein the pin passes through the cylindrical structure of the bottom interface.

11. The table saw accessory of claim 1, wherein the outfeed support comprises a first planer section adjacent to the curved section, and wherein the outfeed support is configured for the first planer section to flatten as the telescopic section extends outward.

12. The table saw accessory of claim 11, wherein the outfeed support comprises a second planer section adjacent to the first planer section and at an angle relative thereto to act as a stop for the material.

* * * * *